United States Patent [19]

Saito

[11] 4,183,538
[45] Jan. 15, 1980

[54] AUTOMATIC RECORD PLAYING APPARATUS

[75] Inventor: Takashi Saito, Yokohama, Japan

[73] Assignee: Victor Company of Japan, Ltd., Yokohama, Japan

[21] Appl. No.: 791,595

[22] Filed: Apr. 27, 1977

[30] Foreign Application Priority Data

| Apr. 30, 1976 [JP] | Japan | 51-54627 |
| Apr. 30, 1976 [JP] | Japan | 51-54628 |
| Apr. 30, 1976 [JP] | Japan | 51-54629 |
| Apr. 30, 1976 [JP] | Japan | 51-54630 |

[51] Int. Cl.² ............................................. G11B 17/06
[52] U.S. Cl. ................................................. 274/15 R
[58] Field of Search ............................. 274/10 R, 15 R

[56] References Cited

U.S. PATENT DOCUMENTS

| 2,488,260 | 11/1949 | Ascoli | 274/10 R |
| 3,433,486 | 3/1969 | Kawaharazaki | 274/15 R |
| 3,697,087 | 10/1972 | Takahashi | 274/10 R |

*Primary Examiner*—Steven L. Stephan
*Attorney, Agent, or Firm*—Haseltine, Lake & Waters

[57] ABSTRACT

An automatic record playing apparatus comprises a rotating member adapted to rotate together with a tone arm and having a projection thereon, a rotation driving member rotated forward and backward over a predetermined range during a predetermined operational period by a rotating force of a turntable, and a pushing means provided on the rotation driving member and adapted to push the projection to rotate the rotating member for returning the tone arm unitarily therewith toward outside of a record disc as the rotation driving member effects initial forward rotation. The pushing means having a first portion for pushing the projection in one rotational direction of the rotating member, and a second portion for pushing elastically the projection in the direction other than the rotational direction of the rotating member. The rotating member being rotated in the result, that the projection is pushed by the first portion of the pushing means in a state where unnecessary revolution thereof is obstructed by the second portion.

3 Claims, 10 Drawing Figures

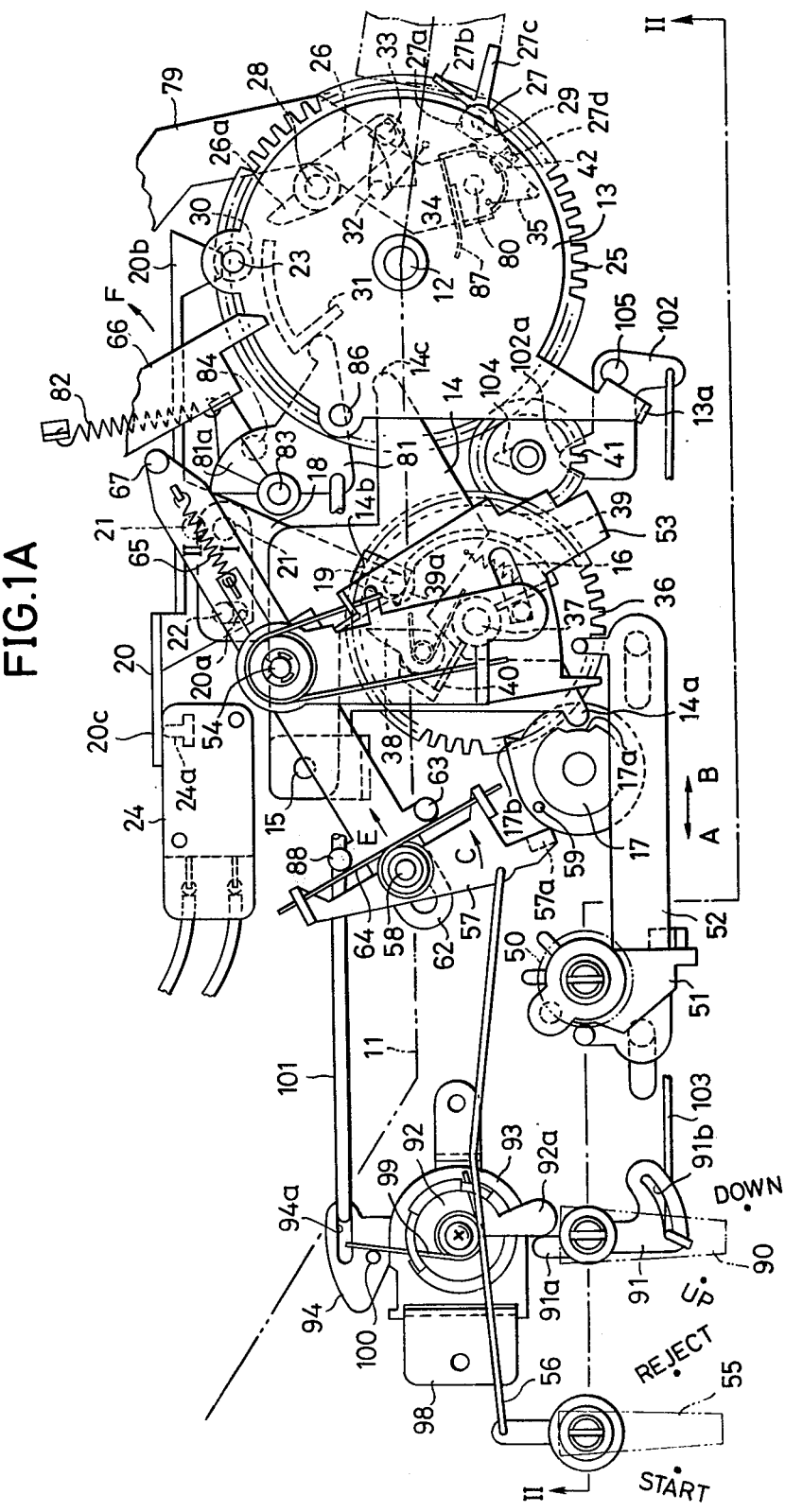

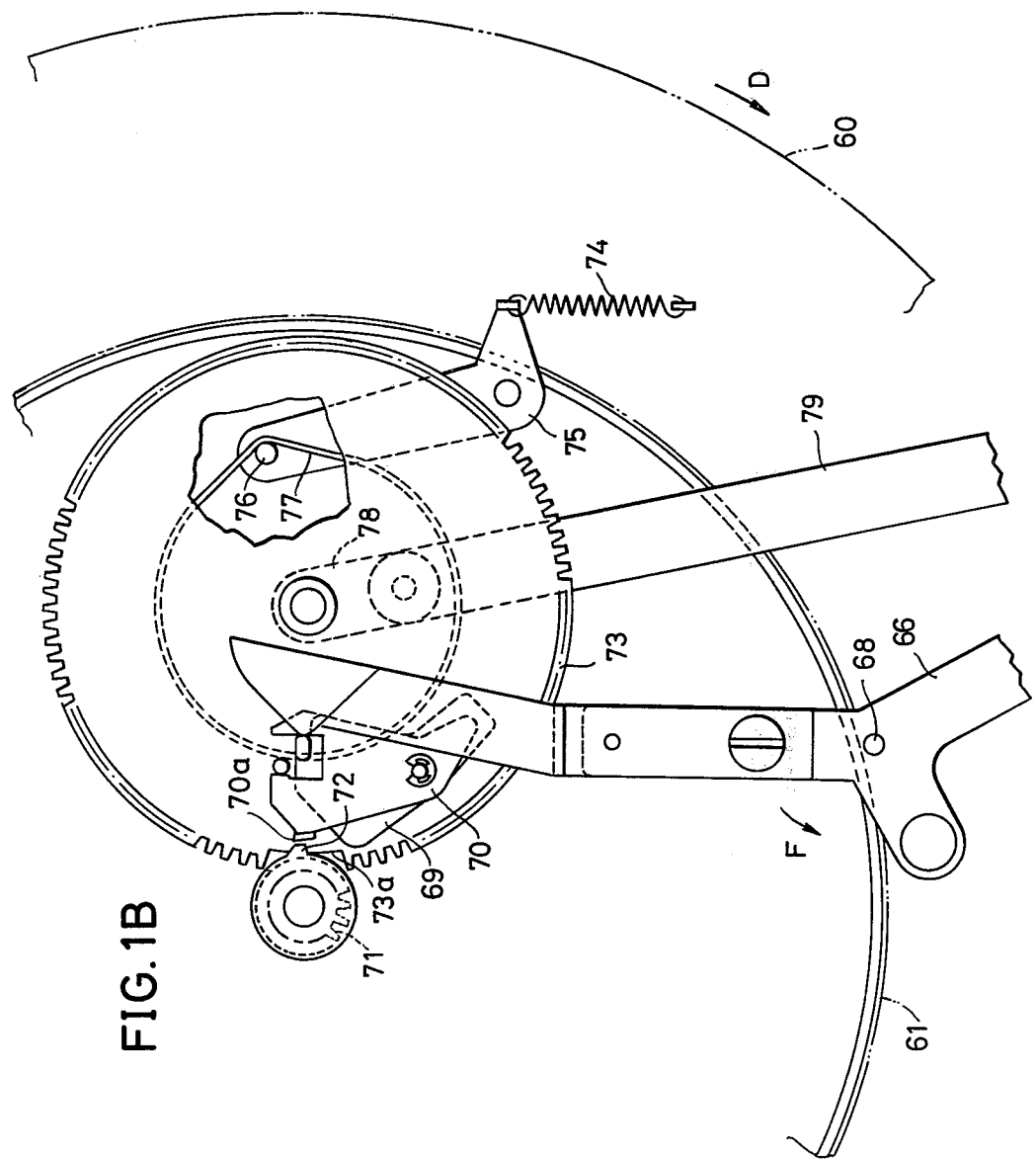

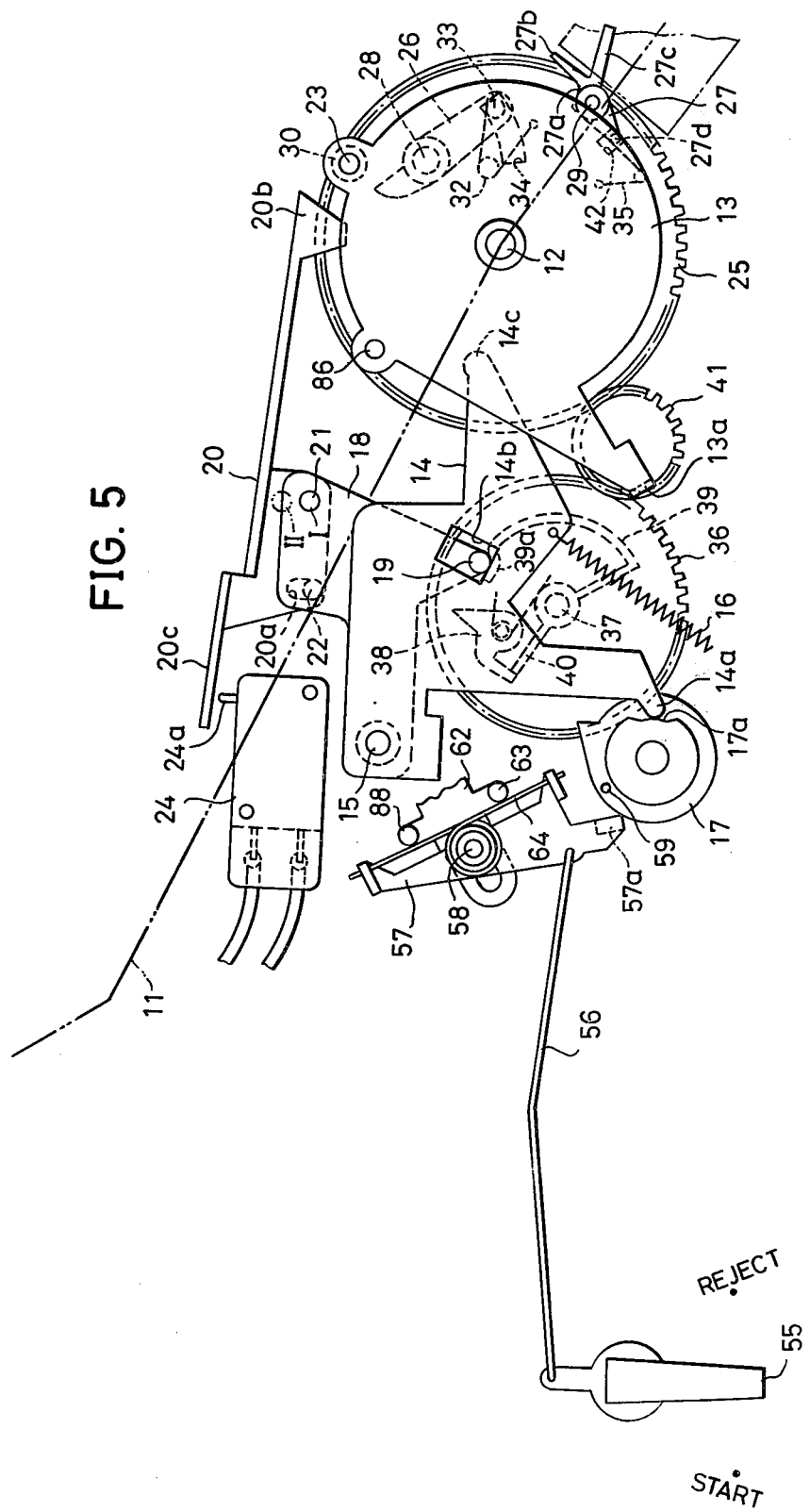

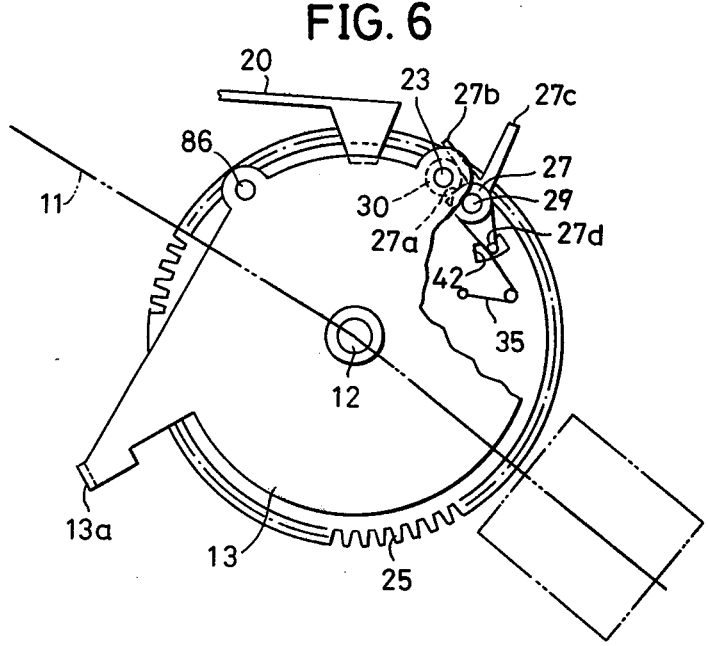
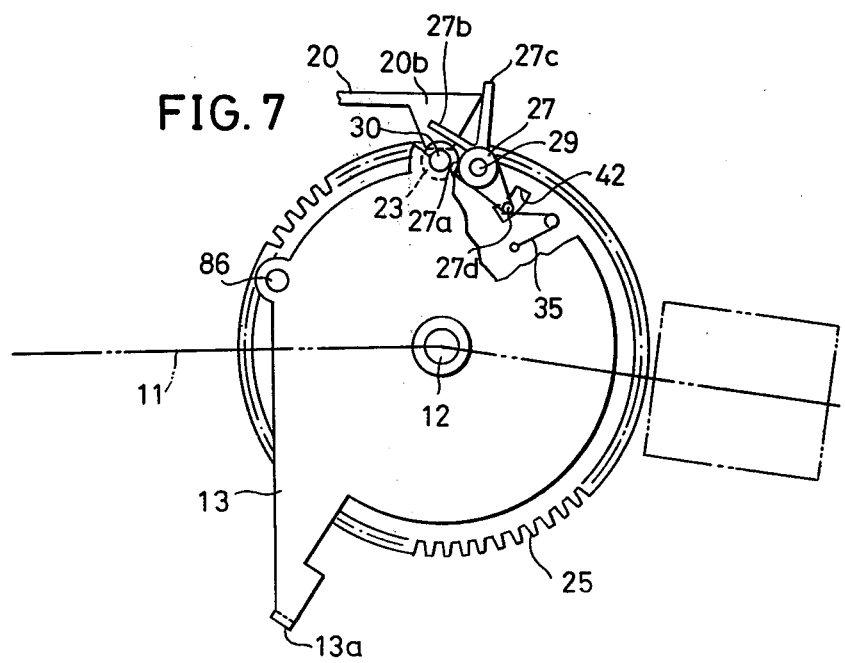

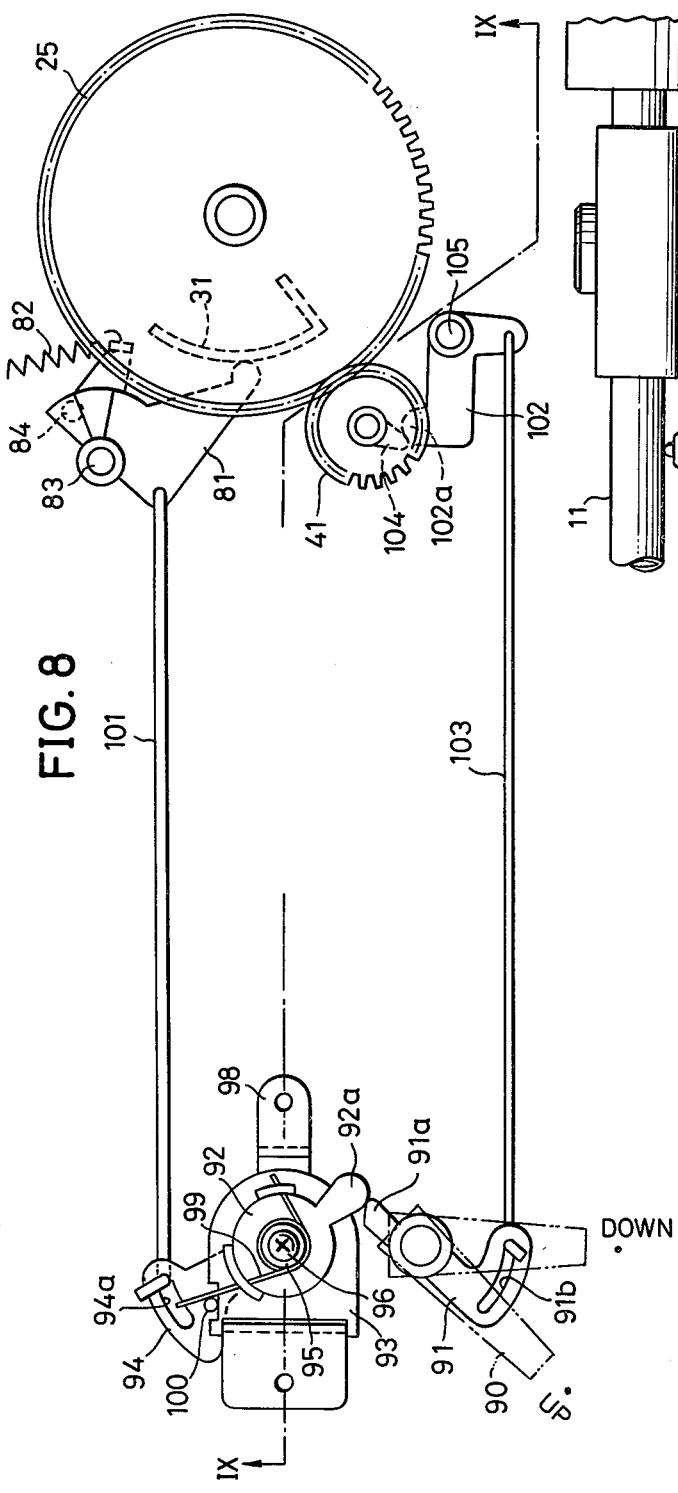
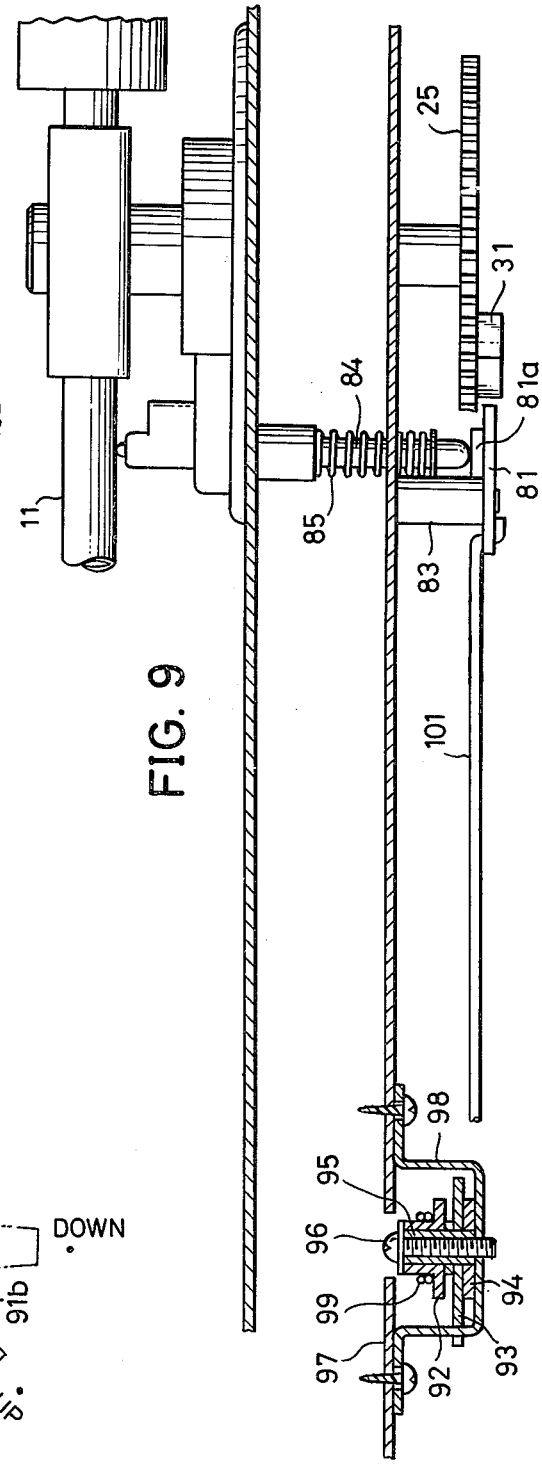

AUTOMATIC RECORD PLAYING APPARATUS

BACKGROUND OF THE INVENTION

The present invention relates generally to automatic record playing apparatuses and more particularly to improvements in an automatic record playing apparatus capable of automatically carrying out leading-in operation and returning operation of a pickup arm, that is, a tone arm.

In automatic record playing apparatuses of the type referred to above automatic return mechanisms for automatically returning the tone arm have been used. Of these mechanisms, those of the construction described below have heretofore been known as those for carrying out the returning operation in a smooth and positive manner.

One known automatic return mechanism comprises a member rotating together with the tone arm, a magnet structure provided on the member, and a member caused to move by an automatic return drive mechanism and caused to be attracted to the magnet structure. At the time of automatic return, the magnet structure is attracted relatively to the moving member, and, as a result, the tone arm is returned together with the movement of the moving member. A problem is encountered in this known mechanism, however, in that, when the magnet structure is attracted to the moving member, the tone arm rotates momentarily and slightly in the direction opposite the return direction.

In another example of a known tone arm return mechanism, a small piece of a material which is pliable and resilient is bonded onto a pushing surface of a moving member moved by an automatic return drive mechanism. The moving member pushes and rotates, via this small piece, a member which rotates together with the tone arm. In this known mechanism, however, the small piece becomes unable to fulfill its specific function as a result of its use over a long time, whereby the reliability of operation over a long time of this mechanism is deficient.

SUMMARY OF THE INVENTION

It is a general object of the present invention to provide a novel and useful automatic record playing apparatus in which the above described difficulties have been overcome.

Another and more specific object of the invention is to provide an automatic record playing apparatus capable of rotating and returning operation of a tone arm to its original position on an arm rest upon completion of record playing or in the middle of record playing.

A still further object of the invention is to provide an automatic record playing apparatus wherein a returning of a tone arm to its original position is accomplished with stability by turning a revolving member in a state wherein a projection provided on said revolving member turning together with a tone arm is pushed by pushing member provided on a revolving drive member not only in the rotational direction but also in the direction other than that direction.

Other objects and further features of the present invention will be apparent from the following detailed description set forth in conjunction with the accompanying drawings.

BRIEF DESCRIPTION OF THE DRAWINGS

FIGS. 1A and 1B are plan views respectively showing a driving mechanism constituting an essential part of one embodiment of an automatic record playing apparatus according to the present invention, in a stop mode state;

FIG. 5 is a plan view showing a mechanism, in a record playing mode following the leading-in operation;

FIG. 6 is a plan view showing an essential part of a mechanism in FIG. 1, in a state where returning operation of tone arm initiates;

FIG. 7 is a plan view showing a mechanism indicated in FIG. 6, in a state where the tone arm has been revolved and returned to an arm rest position;

FIG. 8 is a plan view showing a cueing device indicated in FIG. 1, in a manipulated state; and FIG. 9 is a vertical section taken along the line IX—IX in FIG. 8 as viewed in the arrow direction.

DETAILED DESCRIPTION

Figure 2:
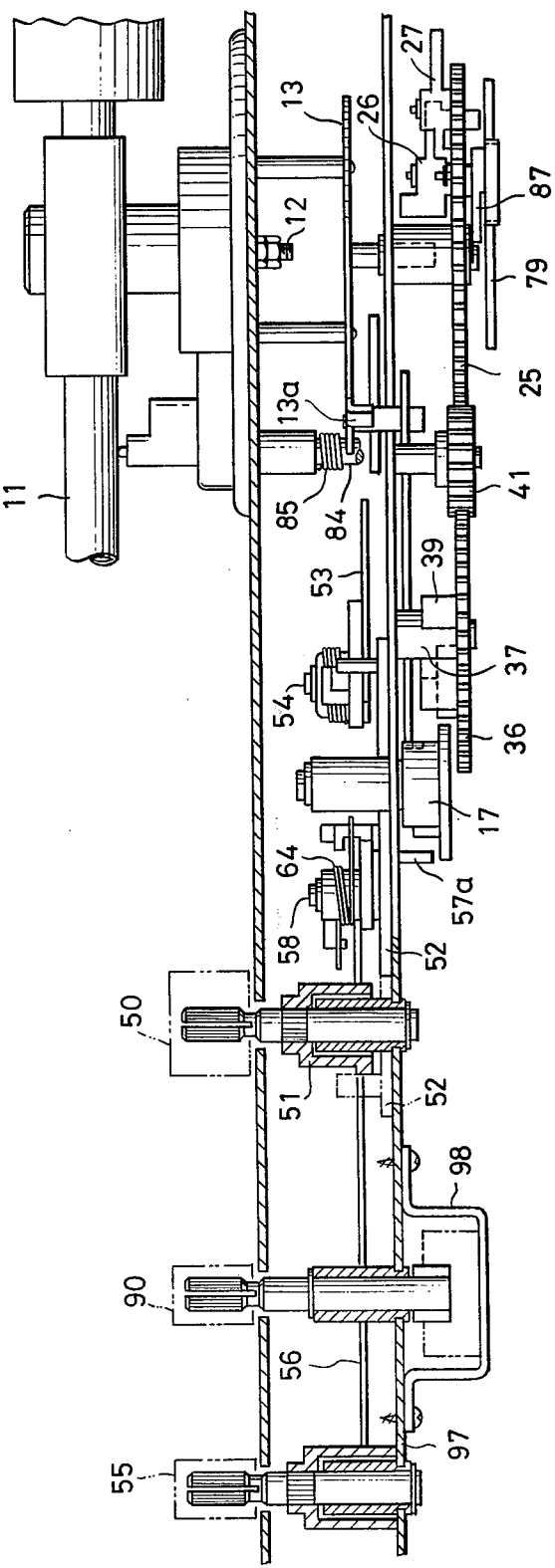
FIG. 2 is a vertical section taken along the line II—II in FIG. 1 as viewed in the arrow direction.

In the stopped mode of operation, a tone arm 11 which is represented simply by it longitudinal centerline shown by two-dot chain line, and which rotates about a vertical shaft 12, is in the position indicated in FIG. 1A and is resting on an arm rest (not shown). A lever 13 rotatable together with the tone arm 11 is at the positional limit of its counterclockwise rotation. A reset plate 14 is rotatably supported on a shaft 15 and is urged by a spring 16 to rotate in the clockwise direction but is limited in its rotation since its engaging part 14a is in contact with and stopped by a recess 17a of a cam 17. A switch plate 18 is rotatably supported by the shaft 15 independently of the plate 14 and is urged by a spring (not shown) to turn in the clockwise direction, but its rotation is limited by the contact engagement of a stud 19 fixed to one end of the switch plate 18 with the edge on one side of a hole 14b provided in the plate 14.

A switch lever 20 is pivotally supported on a pin 21 fixed to the lower surface of the plate 18 and can undergo oscillation within a specific angular range determined by the guided movement of a stud 22 fixed to the lower surface of the plate within a slot 20a formed in the switch lever 20. At the time of this stopped mode of operation, the pin 21 is at a position I, and a projection 20b of the lever 20 is in contact engagement with a stud 23 fixed to the lower surface of the lever 13. As a consequence, the lever 20 is in its state wherein it has rotated in the counterclockwise direction, and its arm 20c has pushed against an actuating member 24a of a power supply switch 24 to open this switch.

A driving gear 25 is provided coaxially with the lever 13, and, on the upper surface thereof, levers 26 and 27 are pivotally supported by pins 28 and 29. A rubber bushing 30 is fitted on the stud 23. A cam part 31 of substantially L-shape is formed on the lower surface of the gear 25. The lever 26 is urged to rotate in the clockwise direction by a toggle spring 32, and a pin 33 fixed thereto is in contact with side edge of a slot 34 provided in the gear 25. The lever 27 is urged to rotate counterclockwise by a toggle spring 35. A pin 27d fixed to the lever 27 is normally in contact with a side edge of a slot 42 provided on the gear 25. The lever 27 has a contacting surface 27a and arm parts 27b and 27c.

A gear 36 is rotatably supported on a shaft 37 and is provided on its upper surface with a ratchet lever 38, a cam 39, and a cam 40. The arcuate part of the cam 39 is so formed as to extend over an angular range of confrontation relative to the stud 19 continually at the time of rotation of the gear 36.

At the time when the tone arm 11 is to be caused to undergo automatic leading-in operation, a selector knob 50 is first turned in accordance with the diameter of the record to be played. A cam 51 is thereby rotated, and a plate 52 slides in the arrow direction A or B.

Figure 3:
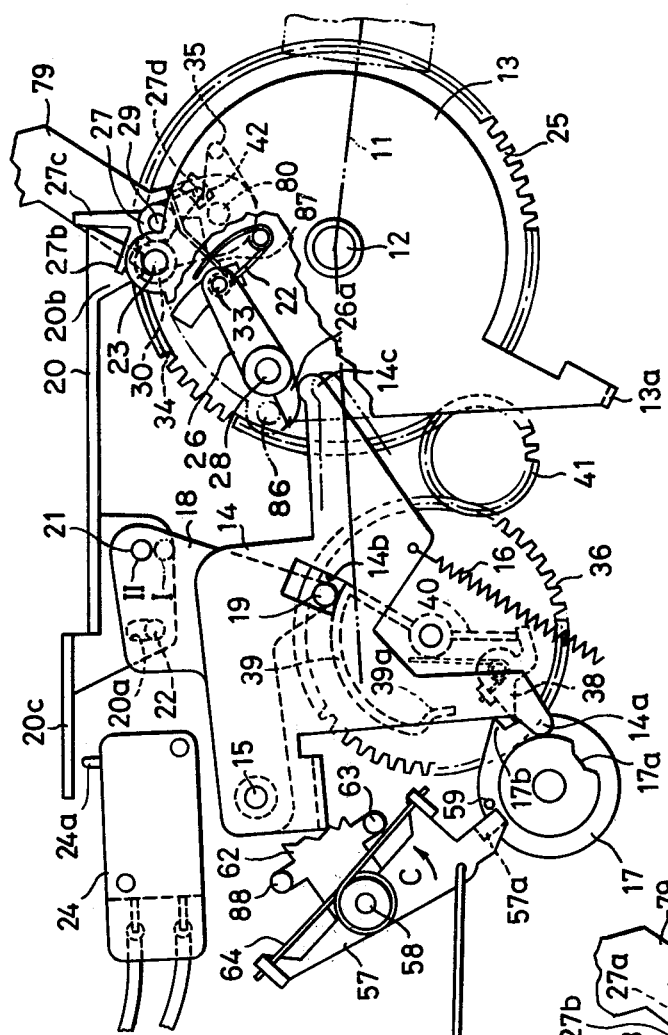
FIG. 3 is a plan view showing a driving mechanism illustrated in FIG. 1, in a state where a tone arm leading-in operation is initiated.

Next, a control lever 55 is turned to a "START" position as indicated in FIG. 3. This rotation of the lever 55 is transmitted through a connecting rod 56 to rotate a lever 57 in the arrow direction C about a shaft 58. Consequently, an end part 57a of the lever 57 pushes a pin 59 fixed to the aforementioned cam 17, which is thereby rotated in the clockwise direction. As a consequence of this rotation of the cam 17, the engaging part 14a of the reset plate 14 disengages from the recess 17a of the cam 17, and the plate 14 is rotated in the counterclockwise direction. The engaging part 14c of the plate 14 thereby moves from the position indicated by two-dot chain line to that indicated by full line.

As a further consequence of the rotation of the reset plate 14, the stud 19 of the aforementioned switch plate 18 is pushed, and the plate 18 is thereby rotated in the counterclockwise direction, whereby the pin 21 moves from the position I to a position II. Consequently, the arm part 20c of the lever 20 rotatably supported on the pin 21 separates from the actuating member 24a of the power supply switch 24, which is thereby closed. As a result of the closing of the switch 24, a phonomotor (not shown) is supplied with electric power and rotates. The rotation of this phonomotor is transmitted through an endless belt 61 to rotate a turntable 60 in the arrow direction D as shown in FIG. 1B.

On the other hand, as another consequence of the above described rotation of the lever 57, a pin 63 of a sliding bar 62 is pushed by an arm part of a spring 64 wound around a projecting part of the lever 57. As a consequence, the bar 62 slides in the arrow direction E, under the guidance of shafts 54 and 58 and counter to the force of a spring 65. A stud 67 of the sliding bar 62 thereby pushes a trip lever 66, which is thereby rotated in the arrow direction F about a pin 68, as shown in FIG. 1B. Consequently, levers 69 and 70 are rotated counterclockwise.

As a result of the rotation of the lever 70, an engaging part 70a of the lever 70 is kicked by a projecting part 72 of a gear 71 provided integrally with the central part of the turntable. This force rotates a gear 73, on which the levers 69 and 70 are provided, in the counterclockwise direction, and a toothless part 73a of this gear 73 which has been facing the gear 71 up to this time rotates, whereby the toothed part of the gear 73 meshes with the gear 71. Accordingly, the gear 73 is thereafter rotated by the rotating gear 71, but, after it has rotated through substantially one revolution and its toothless part 73a reaches its original position where it faces the gear 71, the gear 73 no longer is rotated by the gear 71. Furthermore, a pin 76 of a lever 75 urged to rotate clockwise by a spring 74 enters a valley or depressed part of a cam part 77 provided on the lower surface of the gear 73, whereby the rotation of the gear 73 is stopped.

As the gear 73 rotates, its rotation is transmitted through a crank 78 fixed at one end thereof to the rotating shaft of the gear 73 and a link plate 79 connected at one end thereof to the other end of the crank 78 to rotate the aforementioned gear 25 connected by a pin 80 to the other end of the link plate 79. Thus, one revolution of the gear 73 causes the gear 25 to rotate through 110 degrees of angle, for example, from its position indicated in FIG. 1A to that indicated in FIG. 3. The rotation of the gear 25 is also transmitted through an idler gear 41 meshed with the gear 25 to rotate the aforementioned gear 36 through 170 degrees of angle, for example.

Furthermore, as a consequence of the initial one-half revolution of the gear 73, the gears 25 and 36 undergo a forward rotation in the counterclockwise direction to the position indicated in FIG. 3. As the gear 25 thus rotates, the cam 31 pushes one end of an elevator cam plate 81 and causes it to rotate clockwise about a pin 83 against the force of a spring 82. As a result of this rotation of the cam plate 81, an inclined part 81a thereof pushes up on the lower end of a lifting and lowering shaft 84 against the force of a spring 85. As a result, the tone arm 11 resting on the arm rest is lifted.

Furthermore, as the gear 25 approaches the terminal position of its counterclockwise rotation, the contact surface 27a of the lever 27 pushes against the stud 23. The engaging part 26a of the lever 26 is engaged by the engaging part 14c of the plate 14 rotating in the clockwise direction and is thereby rotated relatively in the clockwise direction about the pin 28. When the lever 26 passes its middle point position during the above described rotation, it is positively rotated in the clockwise direction by the force of the toggle spring 32, and its engaging part 26a is engaged and held by a stud 86. Immediately prior to the engagement of the engaging part 26a by the stud 86 due to the rotation of this lever 26, the pin 33 extending downward through the slot 34 strikes against a leaf spring 87, and the impact force of the engaging part 26a against the stud 86 is cushioned by the elastic deformation of this leaf spring 87. Therefore, the tone arm 11 is stably at rest in its raised position without any swinging movement.

Furthermore, as a result of the above described forward rotation of the gear 36, the ratchet lever 38 rides over and past the engaging part 17b of the cam 17, and the arcuate cam 39, in the vicinity of its extremity, engages the stud 19. As another result of the above described rotation of the gear 36, the lever 53 is released from its engaged state and rotates to the position set by the selector knob 50.

As the gear 73 rotates through the latter half of its revolution, the gear 25 is rotated clockwise through the link plate 79. Consequently, the gears 25 and 36 respectively rotate clockwise again to their respective original positions as indicated in FIGS. 1A and 5. As the gear 25 thus rotates in the clockwise direction, with the mechanism in a state wherein the stud 86 is engaged and held by the engaging part 26a of the lever 26, and the stud 23 is pressed against the lever 27, the lever 13 is rotated in the clockwise direction.

Figure 4:
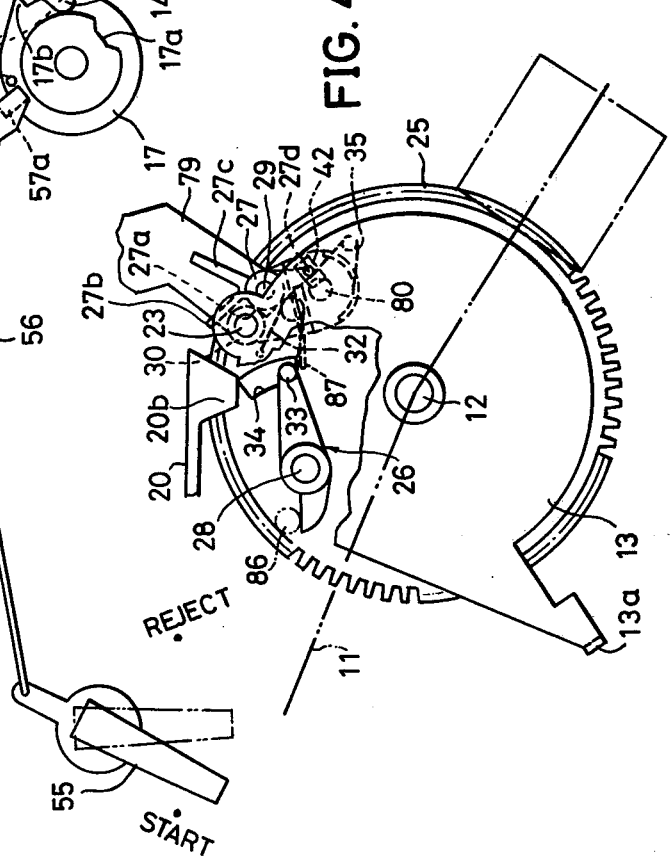
FIG. 4 is a plan view showing a driving mechanism, in a state during the leading-in operation.

As the gear 25 thus rotates in the clockwise direction, the leaf spring 87 moves in a direction to separate from the pin 33, and, in accordance with this movement, the lever 26 rotates until the pin 33 contacts the side wall surface of the slot 34 as indicated in FIG. 4. In accordance with this rotation of the lever 26, the angle of opening between the two arm parts of the toggle spring 35 increases, and the clockwise rotational torque imparted by the toggle spring 35 to the lever 26 increases. As a consequence, the engagement part 26a of the lever 26 positively engages and holds the stud 86, and the lever 13 and the tone arm 11 are positively rotated in leading-in direction.

The lever 13 which rotates unitarily with the gear 25 is limited in rotation when the engaging part 13a at the end of its arm part strikes against the stepped part of the lever 53 rotated to a specific position. When the lever 13 is thus limited in rotation, the engaging part 26a of the lever 26 is caused by the succeeding rotation of the gear 25 to compulsorily over-ride past the stud 86. During this action, the lever 26 is rotated in the counterclockwise direction against the force of the toggle spring 32 and, succeedingly, is rotated in the counterclockwise direction by the toggle spring 32, which has changed in orientation, thereby to assume the state indicated in FIG. 1A. As a result, the stud 86 is released from its locked state. Thereafter, the gear 25 rotates to its position indicated in FIG. 1A independently of the lever 13. As a consequence of the above described rotation of the lever 13, the tone arm 11 turns in the clockwise direction as it is held in its lifted position, and the pickup cartridge at the distal end thereof reaches a position where it confronts the lead-in groove of the record disc to be played.

Furthermore, the elevator cam plate 81 is released from its engagement by the cam part 31 of the gear 25 and rotates counterclockwise, and the lifting and lowering shaft 84 descends. As a consequence, the tone arm 11 descends, and the reproducing (playing) stylus comes into contact with the lead-in groove of the record thereby to start playing.

When the gear 36 rotates in return motion, the engaging part 17b of the cam 17 is engaged by a ratchet lever 38 which is limited in counterclockwise rotation, and the cam 17 is rotated in the counterclockwise direction to its original position. The plate 14 rotates clockwise, its engaging part 14a fitting into the recessed part 17a of the cam 17. The stud 19 is released from its engagement by the side wall surface of the hole 14b but is pressed in contact with the cam 39, and the plate 18 is now at the position indicated in FIG. 3 where it has rotated counterclockwise.

When the gear 36 rotates to the position indicated in FIG. 5, the stud 19 fits into the recessed part 39a at the extremity of the cam 39, and the plate 18 thereupon rotates for the first time in the clockwise direction, the pin 21 moving from the position II to the position I. Since the lever 20 at this time has already been released from its engagement by the stud 23, it is in a state wherein it can rotate freely in the clockwise direction, and power supply switch 24 is maintained in its closed state. As a further result of the above mentioned rotation of the gear 36, the lever 53 rotates to its returned position, and the lever 13 is released from its state of rotational limitation. Consequently, the tone arm assumes a freely rotatable state, and record playing is carried out.

Even in the case where, with the tone arm 11 in a fixed state on the arm rest, the control lever 55 is turned by mistake to the "START" position, the pin 21 is held in the position II by the action of the arcuate cam 39, and the power supply switch 24 is continuously maintained in closed state during the continued one revolution of the gear 73. For this reason, even when the above mentioned erroneous control action is effected, the various mechanisms of the apparatus are stopped in their states wherein they have returned to their original states, and no trouble is caused.

When, upon completion of the record playing, the reproducing stylus traces the lead-out groove of the record disc, the stud 86 of the lever 13 rotating unitarily with the tone arm 11 engages one end side of the trip lever 66, which thereupon rotates in the arrow direction F. As a consequence, similarly as in the case of the above described starting operation, the gear 73 is rotated through one revolution by the turntable gear 71, and, accordingly, the gears 25 and 36 undergo a reciprocating rotation in the counterclockwise direction and then in the clockwise direction.

When the gear 25 thus undergoes the forward rotation, first, the cam plate 81 is engaged by the cam part 31 and rotates in the clockwise direction as viewed in FIG. 1, and the lifting and lowering shaft 84 rises, whereby the tone arm 11 is raised. Then, the lever 27 comes into contact with the rubber bushing 30 fitted on the stud 23 at the position to which the lever 27 has rotated clockwise. During this operation, the lever 27 is forcibly rotated somewhat in the clockwise direction against the spring force of the toggle spring 35, the arcuate extremity of the holding arm part 27b extending in substantially the same direction as the rotational direction of the gear 25 being guided by the peripheral surface of the bushing.

With these mechanisms in this state, the contact surface 27a of the lever 27 comes into contact with the bushing 30 as indicated in FIG. 6, and the arm part 27b is acted upon by the force of the spring 35 and pushes the bushing 30 in a direction perpendicular to the above mentioned rotational direction of the gear 25. As a consequence, the lever 13 and the tone arm 11 rotating unitarily therewith are restricted in their free rotation in their return direction by the relatively large frictional force between the bushing and the arm part 27b.

Since the tone arm 11 has a relatively great mass and, moreover, is being engaged by an arm shifter at the time of above mentioned contacting, the lever 27 engages and holds the bushing 30 as described above without flinging aside the tone arm 11.

As a consequence of the succeeding forward rotation of the gear 25, the tone arm 11 rotates and returns smoothly and stably in synchronism with the rotation of the gear 25 as it is pressed by the contact surface 27a of the lever 27 without rotating freely in the return direction as a result of inertial force.

When the gear 25 rotates to the terminal position of its forward movement, and the tone arm 11 rotates and returns to its position on the arm rest, the lever 27 is engaged at its arm part 27c by the engaging part 20b of the switch lever 20 and is thereby rotated relatively clockwise against the force of the spring 35 as indicated in FIG. 7. Consequently, the arm part 27b separates from the bushing 30, which is thereby released from the holding action of the lever 27.

Furthermore, as a consequence of the rotation of the gear 25 to the above mentioned position, the lever 20 is engaged at its engaging part 20b by the stud 23, but, since it is in a state wherein it can rotate somewhat freely, the pin 21 being held at the position II by the action of the cam 39 of the gear 36, the power supply switch 24 remains in its closed state. In addition, since the plate 14 at its engaging part 14a is engaged in the cam recess 17a and is turned in the clockwise direction, the lever 26 does not strike against the engaging part 14c and does not rotate.

The gear 25 succeedingly thereafter rotates in the return clockwise direction. At this time, the bushing 30 has been released from the holding action of the lever 27, and since the lever 26 is in a position where it does not engage the stud 86, the gear 25 rotates to its original position as indicated in FIG. 1 independently of the lever 13 and the tone arm 11, that is, with the tone arm 11 left in its returned position. Furthermore, the return rotation of the gear 25 causes the cam plate 81 to rotate and the tone arm 11 to descend to be supported by the arm rest.

When the gears 25 and 36 rotate in their return rotations to their respective terminal positions, the stud 19 fits into the recessed part 39a of the cam 39, and the plate 18 rotates, whereby the shaft 21 returns to the position I. Consequently, the lever 20, one end of which is engaged by the stud 23, rotates further in the counterclockwise direction, and the power supply switch 24 is opened, whereupon the phonomotor (not shown) is stopped.

As described above, the rotations of the tone arm 11 in the lead-in direction and the return direction are accomplished stably without exerting unnecessary load on the highly precise bearings of the rotatationally supporting parts. For this reason, there is no necessity of providing specially a muting switch for operating at the time of the above mentioned rotational operation.

Furthermore, in the above described enbodiment of the invention, the material of the bushing 30 is rubber, but it is not necessarily so limited. The only requirement is that the arm part 27b and the bushing 30 be of materials such that, when they are brought into mutual contact, a considerably great frictional force will develop therebetween. A still further possible modification is that wherein a lever corresponding to the lever 27 is fixedly provided on the gear 25, the arm part extending in the rotational direction of the gear 25 is made elastically deformable, and, at the time of the above described return operation, the arm part deforms elastically to over-ride onto the bushing side face thereby to positively contact the same.

Next, the control precedure and the operation in the case where the tone arm is automatically returned at an intermediate point during the playing of the record will be described.

For this operation, the control lever 55 is turned to a "REJECT" position. This rotation of the lever 55 causes the lever 57 to turn clockwise through the connecting rod 56. Further, the sliding lever 62 is pushed a pin 88 thereof by an arm of the spring 64. As a result of it, the lever 62 slides in the arrow direction E as shown in FIG. 1A, and further, the gear 73 is driven to rotate one revolution, similarly as in the case of above described starting operation. The revolution of the gear 73 causes the gears 25 and 36 to undergo forward and backward rotation. As the gears 25 and 36 thus rotate, the tone arm 11 is lifted and turned stably to the original position indicated in FIG. 1A by the operation of the lever 27, similarly as in the above mentioned case where a record playing operation is completed. Whereupon the tone arm 11 is placed on the arm rest and the above mentioned one change-cycle operation terminates, the power supply switch 24 is opened and the phonomotor stops its rotation.

Next to be described is the operation when the control lever 55 is manipulated, in a state where the tone arm 11 has been lifted while the record playing operation is still continued, for instance.

When a cueing control knob 90 is turned from a "DOWN" position to an "UP" position as indicated in FIG. 8, a lever 91 is turned together with the knob 90. An engaging part 91a of the lever 91 becomes in pushing engagement with a projecting part 92a of a lever 92. As a consequence, the lever 91 is held at the position thus turned, and the knob 90 is also held at the "UP" position.

The lever 92 is mounted on a braket 98 fixed to a base plate 97 by a skrew 96, in a state being engaged or fitted to a bushing 95 together with a plate 93 and a lever 94. The plate 93 is restricted its revolution with a cut-away part thereof being engaged with the bracket 98. The levers 91 and 94 are supported so as to rotate independently with each other. A torsion spring 99 is wound around a projecting cylindrical part of the lever 92, and one arm portions the other arm portions thereof are respectively engaged with an engaging part of the lever 92, and a pin 100 fixed to the lever 94.

The above mentioned manipulation causes a lever 92 to be engaged by the lever 91 and to turn counterclockwise counter to the spring force of the spring 99, whereby the spring 99 is deformed to be energized. The lever 94 is then slowly turned counterclockwise by the above mentioned spring force, counter to a viscous resistance of grease having high viscosity applied between the lever 94 and the lever 93, irrespective of manipulative turning speed of the knob 90. Interrelatedly with the turning of the lever 94, the cam plate 81 is turned clockwise through a rod 101. Accordingly, the shaft 84 is moved upward, and the tone arm 11 is lifted slowly.

The above mentioned revolution of the lever 91 causes a connecting rod 103 connected to a returning lever 102 of crank shape to confront, at the one end thereof, with one terminal side edge of a slot 91b.

Thereafter, when the control lever 55 is manipulated to the "START" or "REJECT" position, the gears 25, 41, and 36 undergo forward and backward rotation and the change-cycle is effected, similarly as in the preceding case, whereby the tone arm 11 is turned to the position above the arm rest.

When the gear 41 rotates, a cam 104 rotates together therewith. The lever 102 is kicked, at a projection 102a thereof, by the cam 104 thereby to be forced to revolve counterclockwise about a shaft 105. The rotation of the lever 102 causes the the lever 91 to turn counterclockwise over a small angle through the connecting rod 103. Accordingly, the state wherein the lever projecting part 92a pushes the engaging part 91a is released. As a consequence, the control knob 90 and lever 91 are released from the holding state at the "UP" position thereby being returned automatically to the "DOWN" position as indicated in FIG. 1A. As a result of it, the cam plate 81 is released from the turning restriction by the lever 94, and thus rotates counterclockwise by the spring 82 as the change-cycle preceeds. Consequently, the tone arm 11 automatically is lowered on the arm rest and is placed thereon.

Moreover, when the control knob 90 is at the "DOWN" position, the cam plate 81 is turned clockwise independent of the lever 94, with the rod 101 being moved along the slot 94a of the lever 94. For this reason, the above described mechanism cueing device does not impart any load to the aforementioned tone arm 11 leading-in and returning operation.

Furthermore, when the tone arm 11 is manually turned toward the record disc in a state as indicated in FIG. 1A, the lever 13 is rotated together with the tone arm 11. The engaging part 20b of the switch lever 20 thereby disengages from the stud 23, whereby the power supply switch 24 is closed to energize or drive the phonomotor.

When the tone arm 11 is manually returned to the arm rest during the record playing operation, contrary to the preceding case, the engaging part 20b of the switch lever 20 is engaged with the stud 23 thereby to be rotated counterclockwise. As a consequence, the power supply switch 24 is opened, and the phonomotor stops its rotation.

Further, this invention is not limited to these embodiments but various variations and modifications may be made without departing from the scope and spirit of the invention.

What is claimed is:

1. An improved automatic record playing apparatus employing a rotatable turntable driven by a motor, and a rotatable tone arm associated therewith, the improvement comprising: a drive means; a first rotatable member rotated by the rotating force of the turntable upon operation of the drive means; a second rotatable member adapted to relate rotates together with the tone arm; said second rotatable member having a projection thereon; a third rotatable member rotatably separated from the second rotatable member, said third rotatable member being coaxially disposed with respect to the second rotatable member; means for translating and transmitting the rotational force of the first rotatable member to the third rotatable member for rotating the third rotatable member in forward and backward directions over a specific range; an engaging member provided on the third rotatable member, adapted to engage and push the projection to rotate the second rotatable member, for returning the tone arm unitarily therewith toward the outside of a record disc as the third rotatable member effects initial forward rotation, said engaging member having a first portion for contacting and pushing the projection in a forward rotational directional of the third rotatable member together with the rotation of the third rotatable member, and a second portion extending from the first portion tangentially to the direction of rotation of the third rotatable member; and an energizing member for energizing the engaging member so that the second portion of the engaging member pushes the projection in a direction substantially perpendicular to the rotational direction of the second rotatable member, said second rotatable member being rotated by pushing the first portion of the engaging member to the projection, together with the rotation of the third rotatable member where a frictional force between the projection and second portion of the engaging member inhibits unnecessary fluctuation of rotation of the second rotatable member by pushing of the second portion against the projection in response to a pushing force of the energizing member.

2. An improved automatic record playing apparatus as claimed in claim 1, wherein: said engaging member further has a third portion projecting outwardly, and which further comprises a stop member for engaging the third portion at the terminal end of the rotation of the third rotatable member in a forward direction, said engaging member being slightly rotated by engagement of the third portion against the stop member to enable the second portion to separate from the projection.

3. An improved automatic record playing apparatus as claimed in claim 1, wherein: switch means are provided in a power source supply circuit for the motor; a switch lever means serving to open and close the switch, said switch lever means being shifted by said projection, and means for turning the switch lever means thus shifted at the time when the third rotatable member terminates the backward rotation.

* * * * *